US010787379B2

(12) United States Patent
Archer, III

(10) Patent No.: US 10,787,379 B2
(45) Date of Patent: Sep. 29, 2020

(54) METHODS FOR TREATING SULFIDES IN GASEOUS STREAMS

(71) Applicant: BILL ARCHER, LLC, Charlotte, NC (US)

(72) Inventor: William Moseley Archer, III, Charlotte, NC (US)

(73) Assignee: BILL ARCHER, LLC, Charlotte, NC (US)

(*) Notice: Subject to any disclaimer, the term of this patent is extended or adjusted under 35 U.S.C. 154(b) by 0 days.

(21) Appl. No.: 16/733,436

(22) Filed: Jan. 3, 2020

(65) Prior Publication Data
US 2020/0140298 A1    May 7, 2020

Related U.S. Application Data

(60) Continuation-in-part of application No. 16/397,123, filed on Apr. 29, 2019, now Pat. No. 10,570,038, which is a continuation of application No. 16/165,010, filed on Oct. 19, 2018, now Pat. No. 10,315,940, which is a division of application No. 14/854,403, filed on Sep. 15, 2015, now Pat. No. 10,112,853.

(51) Int. Cl.
| | |
|---|---|
| *B01D 53/52* | (2006.01) |
| *B01D 53/48* | (2006.01) |
| *B01D 53/78* | (2006.01) |
| *B01D 53/14* | (2006.01) |
| *C01B 17/96* | (2006.01) |
| *C02F 1/72* | (2006.01) |
| *C01B 17/64* | (2006.01) |
| *C01B 17/05* | (2006.01) |
| *C02F 1/74* | (2006.01) |
| *C02F 101/10* | (2006.01) |
| *C02F 103/36* | (2006.01) |
| *C02F 103/18* | (2006.01) |
| *E21B 21/06* | (2006.01) |
| *C02F 103/10* | (2006.01) |

(52) U.S. Cl.
CPC ............ *C02F 1/725* (2013.01); *C01B 17/05* (2013.01); *C01B 17/64* (2013.01); *C01B 17/96* (2013.01); *C02F 1/74* (2013.01); *C02F 2101/101* (2013.01); *C02F 2103/10* (2013.01); *C02F 2103/18* (2013.01); *C02F 2103/365* (2013.01); *C02F 2303/02* (2013.01); *C02F 2305/02* (2013.01); *E21B 21/068* (2013.01)

(58) Field of Classification Search
None
See application file for complete search history.

(56) References Cited

U.S. PATENT DOCUMENTS

| | | | |
|---|---|---|---|
| 2,897,140 A | | 7/1959 | Gislon et al. |
| 3,104,951 A | * | 9/1963 | Urban .................. C01B 17/05 |
| | | | 423/576.4 |
| 3,226,320 A | | 12/1965 | Meuly et al. |
| 3,913,673 A | | 10/1975 | Barber |
| 4,076,621 A | | 2/1978 | Hardison |
| 4,079,001 A | | 3/1978 | Haase |
| 4,229,747 A | | 10/1980 | Hwang |
| 4,520,072 A | | 5/1985 | Yoshino |
| 4,615,714 A | | 10/1986 | Turk et al. |
| 4,992,078 A | | 2/1991 | Meszaros |
| 5,009,869 A | | 4/1991 | Weinberg et al. |
| 5,470,356 A | | 11/1995 | Meszaros |
| 5,585,051 A | | 12/1996 | Hosie et al. |
| 5,922,087 A | * | 7/1999 | Nishioka ............ C09B 67/0078 |
| | | | 8/527 |
| 5,948,122 A | | 9/1999 | Xu et al. |
| 5,961,670 A | | 10/1999 | Cote et al. |
| 8,962,715 B2 | | 2/2015 | Engelhardt et al. |
| 8,993,488 B2 | | 3/2015 | Matza et al. |
| 10,112,853 B2 | | 10/2018 | Archer, III |
| 2003/0038078 A1 | | 2/2003 | Stamper et al. |
| 2013/0059357 A1 | * | 3/2013 | Bach .................... C12M 21/04 |
| | | | 435/167 |
| 2013/0259743 A1 | | 10/2013 | Keasler et al. |
| 2014/0166289 A1 | | 6/2014 | Martinez et al. |
| 2014/0374104 A1 | | 12/2014 | Seth |
| 2015/0368137 A1 | | 12/2015 | Miller |
| 2018/0297845 A1 | * | 10/2018 | Mengel ............. B01D 53/1468 |

(Continued)

FOREIGN PATENT DOCUMENTS

| | | |
|---|---|---|
| GB | 788559 A | 1/1958 |
| GB | 910661 A | 11/1962 |
| GB | 1122889 A | 8/1968 |

OTHER PUBLICATIONS

Naito et al., "The Chemical Behavior of Low Valence Sulfur Compounds. VII. The Oxidation of Ammonium Sulfide and Ammonium Sulfite with Compressed Oxygen in Aqueous Ammonia Solution." Bull. Chem. Soc. Jap., vol. 44, pp. 2434-2436 (1971).*
Office Action, U.S. Appl. No. 16/793,130, dated Apr. 30, 2020.
The Chemistry of Synthetic Dyes ed., K Venkataraman, p. 32, 1974.
Maeda, Yoshimichi, et al.; Treatment of sulfur dye waste waters. V. Oxidation of sodium sulfide by oxygen, Kogyo Yosui, 1967, pp. 60-67, vol. 106, Database: Caplus; Abstract Only.
Wolf, Friedrich, et al; "Oxidation of sulfide ions by oxygen in the presence of sulfur dyes. II," Fortschritte der Wasserchemie und Ihrer Grenzgebiete, 1968, pp. 81-92, No. 10, Databse: Caplus; Abstract Only.

(Continued)

*Primary Examiner* — Daniel Berns
(74) *Attorney, Agent, or Firm* — Tristan A. Fuierer; Olive Law Group, PLLC

(57) ABSTRACT

A method for removing hydrogen sulfide from a biogas, wherein the hydrogen sulfide is absorbed in an aqueous liquid to produce a cleaned gas having a reduced amount of hydrogen sulfide relative to the biogas. The aqueous liquid is subsequently treated by contacting with a sulfur dye or sulfurized vat dye in the presence of an oxidizer such as oxygen gas, to convert the sulfides in the aqueous liquid to a non-toxic, water-soluble, product.

15 Claims, No Drawings

(56) References Cited

U.S. PATENT DOCUMENTS

2019/0047886 A1   2/2019   Archer, III
2019/0262769 A1   8/2019   Jackson

OTHER PUBLICATIONS

The Merck Index, Monograph No. M6107, (2013), via RSC.org.
Search Report for corresponding PCT/US2016/050336, dated Dec. 22, 2016.
Written Opinion for corresponding PCT/US2016/050336, dated Dec. 22, 2016.
U.S. Appl. No. 16/437,597; Office Action dated Aug. 29, 2019.
U.S. Appl. No. 16/437,597; Final Office Action dated Dec. 26, 2019.

* cited by examiner

METHODS FOR TREATING SULFIDES IN GASEOUS STREAMS

CROSS REFERENCE TO RELATED APPLICATIONS

This application is a continuation-in-part application claiming priority to U.S. patent application Ser. No. 16/397,123 filed on Apr. 29, 2019, which is continuation application claiming priority to U.S. patent application Ser. No. 16/165,010 filed on Oct. 19, 2018, now U.S. Pat. No. 10,315,940, which is a divisional application claiming priority to U.S. patent application Ser. No. 14/854,403 filed on Sep. 15, 2015, now U.S. Pat. No. 10,112,853, all of which are hereby incorporated by reference herein in their entirety. This application is also co-pending with U.S. patent application Ser. No. 16/684,832, filed on Nov. 15, 2019, and U.S. patent application Ser. No. 16/437,597, filed on Jun. 11, 2019.

FIELD OF THE INVENTION

The present invention relates to the treatment of gaseous mixtures comprising hydrogen sulfide. More particularly, the present invention is a process for the removal of hydrogen sulfide from biogas, wherein the hydrogen sulfide gas is introduced into an aqueous solution, and the aqueous solution comprising the sulfide is contacted with a sulfur dye in the presence of an oxidizer such as oxygen to convert the sulfide to a non-toxic, water-soluble, product.

BACKGROUND

Biogas, which is a mixture of several gases, may be produced by the breakdown of organic matter in low oxygen conditions. For example, biogas may be produced by the anaerobic digestion or fermentation of organic matter (e.g., manure, sewage sludge, wastewater, municipal solid waste, biodegradable waste, biodegradable feedstock, etc.).

The composition of biogas, which varies with the type of organic matter (e.g., biomass) from which it is derived is predominately methane ($CH_4$) and carbon dioxide ($CO_2$), with relatively small amounts of hydrogen sulfide ($H_2S$), ammonia ($NH_3$), hydrogen ($H_2$), nitrogen ($N_2$), carbon monoxide (CO), oxygen ($O_2$), water vapor, and/or siloxanes. For example, the composition of biogas may include about 50-70% $CH_4$, about 30-50% $CO_2$, and 0-4000 ppm $H_2S$.

Biogas is currently an insignificant source of $H_2S$, but is growing due to the greater utilization of anaerobic digesters and landfill gas. The most common local sources of $H_2S$ come from the anaerobic bacterial breakdown of organic matter in waste-water treatment plants, city landfills, and septic tanks. Many landfills and wastewater treatment plants capture $H_2S$ along with methane and $CO_2$ in the form of biogas. In its raw form, biogas may be combusted (e.g., in an engine, turbine, or boiler) in order to generate heat (e.g., steam) and/or electricity. For example, biogas has been used in combined heat and power (CHP) plants in order to generate electricity and heat. In addition, small scale biogas digesters are increasingly being used worldwide to supply biogas to households. Biogas can also be used as fuel for vehicles or as a substitute for natural gas. It should be appreciated that a hydrocarbon gas other than methane may be present in the biogas. Reference to methane is intended herein to include methane and any other hydrocarbon fuels present in biogas.

While $H_2S$ is only 0.1-2% of the biogas stream, the presence of $H_2S$ in biogas is generally undesired because it causes odors, is corrosive, and produces sulfur emissions when the biogas is combusted. Biogas combustion equipment may have maximum recommended $H_2S$ content (e.g., less than 200 ppm). The removal of $H_2S$ may be required to protect the combustion equipment, particularly when the combustion equipment includes an internal combustion engine or turbine.

In the prior art, hydrogen sulfide ($H_2S$) has been removed from biogas by adsorption on activated carbon (e.g., impregnated activated carbon such as ZnO impregnated carbon), adsorption on molecular sieves, adsorption using iron oxides (e.g., iron oxide impregnated wood chips (iron sponge)), iron oxide pellets, or proprietary iron-oxide media), physical absorption (e.g., water scrubbing), chemical absorption (e.g., NaOH washing), and/or biofilters or biotrickling filters (e.g., where the biogas is forced through a moist, packed bed that contains microorganisms).

For example, absorption liquids containing sulfides are generated when a gas containing hydrogen sulfide contacts an aqueous liquid to absorb the hydrogen sulfide. While hydrogen sulfide has some solubility in water, the amount of gas dissolved is limited. Typically, the aqueous liquid will contain an alkali to convert the hydrogen sulfide into a water-soluble bisulfide or sulfide ion to greatly enhance the rate and amount of hydrogen sulfide that is absorbed into the liquid.

One method of eliminating sulfides in aqueous liquids is to oxidize them to a new compound that is not malodorous or toxic. The oxidation of sulfides in aqueous liquids can be accomplished chemically with oxidizing agents such as hydrogen peroxide, chlorine dioxide, hypochlorite salts, methylmorpholine-N-oxide, nitrate/nitrites. These methods are effective but have drawbacks which can include high chemical costs, handling of hazardous chemicals and formation of unwanted by-products. Oxidation can be accomplished biologically, but this is usually expensive and can produce odors in the treatment units. A third method is oxidation with molecular oxygen in the presence of a catalyst. Sulfides may also be treated by other methods such as absorption or sequestering.

The most common catalyst for sulfide oxidation is a chelated metal catalyst, most particularly iron chelated by an aminopolycarboxylic acid. The normal product of oxidation with this catalyst in aqueous fluids is elemental sulfur which precipitates. The catalyst is typically regenerated with molecular oxygen, normally atmospheric air which can also degrade the catalyst. This method for oxidizing sulfides is not without drawbacks. It requires removal of solid elemental sulfur and replenishment of catalyst.

There is a continued need for a simple and efficient method of collecting and removing hydrogen sulfide from a biogas stream, wherein the method is simple and self-regenerating and no toxic byproducts are produced.

BRIEF SUMMARY OF THE INVENTION

The present invention provides an inexpensive alternative to the traditional treatment of sulfides by expensive chemicals or by oxygen catalyzed by chelated metal which creates a sulfur precipitate. It has been discovered that sulfur dyes and sulfurized vat dyes will oxidize sulfides dissolved in aqueous fluids when the fluid is contacted with a gas comprising oxygen, for example, atmospheric air. The present invention uses small amounts of inexpensive sulfur dye or sulfurized vat dye as a means for oxidation of sulfides in the presence of oxygen or other oxidizers. Sulfur dyes and sulfurized vat dyes are stable under the highly alkaline conditions often associated with absorption or scrubbing of hydrogen sulfide from gaseous streams. Sulfide oxidation under alkaline conditions in the presence of sulfur dye is very simple and predominantly produces a non-toxic soluble by-product, thiosulfate. In many applications, the soluble nature of the treatment product will be an advantage.

In one embodiment, the present invention relates to a method for treating sulfide in an aqueous fluid comprising contacting the fluid with an oxidizer in the presence of at least one sulfur dye or sulfurized vat dye.

In a still further embodiment, the present invention relates to a method for treating sulfide produced by hydrogen sulfide absorption in an alkaline aqueous liquid to form an adsorption liquid comprising dissolved sulfides. The method comprises contacting the absorption liquid with at least one sulfur dye or sulfurized vat dye and subsequently contacting the absorption liquid with an oxidizer to convert the sulfides to non-toxic, water-soluble, products.

In another embodiment, the present invention relates to method of removing hydrogen sulfide from biogas and treating removed hydrogen sulfide, said method comprising:
introducing the biogas to an aqueous absorption liquid to absorb at least a portion of the hydrogen sulfide in the liquid;
harvesting any gas remaining, wherein the remaining gas has a concentration of hydrogen sulfide that is reduced relative to the biogas;
introducing at least one sulfur dye or sulfurized vat dye catalyst to the aqueous absorption liquid;
introducing a gas comprising oxygen to oxidize sulfides in the aqueous absorption liquid to soluble sulfur-containing salts.

DETAILED DESCRIPTION OF THE INVENTION

The present invention relates to a method of removing hydrogen sulfide from biogas, more preferably introducing the biogas to an aqueous liquid, and treating the aqueous liquid comprising sulfides to convert the sulfides to non-toxic products.

A gaseous renewable fuel from waste feedstock can be generated by the anaerobic digestion of organic material derived from plants, vegetation, municipal waste, animal waste, animal byproducts, manure, sewage sludge, food waste, food processing waste, agricultural residues including corn stover and wheat straw and/or other biomass, hereinafter referred to collectively as "waste organic material." The combustible product of the anaerobic digestion is referred to herein as "biogas" which may be produced by anaerobic digestion of any waste organic material. The biogas may be produced by decomposing waste organic material under anaerobic conditions, such as in landfills.

As defined herein, the term "sulfide" or "sulfides" includes all forms of inorganic sulfide including hydrogen sulfide, bisulfide ions, sulfide ions and polysulfide ions.

The waste organic materials may be introduced to an anaerobic treatment "unit," which includes holding the waste organic materials in an air-tight tank or a covered surface impoundment for anaerobic digestion therein. It should be appreciated that the anaerobic treatment "unit" can include landfills, or the equivalent thereof, wherein landfill waste, which may be covered and compressed as a result of the weight of additional material deposited thereon, decomposes under anaerobic conditions using bacteria. A collection system at the landfill site is appropriately engineered so that the resultant biogas, also referred to as landfill gas, may be captured. Within an anaerobic treatment unit, bacteria will degrade the waste organic material, generating a number of products including, but not limited to, hydrogen sulfide, carbon dioxide, and methane gas. The methane can be harvested and burned/combusted for energy production, but first the hydrogen sulfide should be separated from the methane gas to prevent the corrosive and other deleterious effects of combusting hydrogen sulfide.

The present invention relates to the removal and treatment of hydrogen sulfide comprising introducing the biogas to an aqueous solution to absorb the hydrogen sulfide, to produce a "cleaned" gas having a reduced hydrogen sulfide content relative to the raw biogas and a sulfide-containing absorption solution. The sulfide-containing absorption solution is treated by contacting the solution with sulfur dyes or sulfurized vat dyes in the presence of oxygen to reduce or eliminate sulfide levels in the solution. It should be appreciated that since methane is present in the biogas, care needs to be taken to avoid an explosive mixture of methane and oxygen.

The first aspect relates to a method for collecting and treating hydrogen sulfide present as a component in a gaseous stream, e.g., a biogas stream, said method comprising: absorbing the biogas into an aqueous absorption liquid to substantially oxidize absorbed hydrogen sulfide to at least one non-hazardous constituent, wherein the aqueous absorption liquid comprises at least one sulfur dye or a sulfurized vat dye. The aqueous absorption liquid has a pH that permits the absorption of hydrogen sulfide from the biogas while preventing the precipitation of elemental sulfur during the oxidation step, for example, greater than about 6.8, preferably in a range from about 6.8 to about 11. In one embodiment, the aqueous absorption liquid is sufficiently alkaline (having a pH greater than about 9) to facilitate the absorption of hydrogen sulfide. A sulfur dye or sulfurized vat dye is added to the aqueous absorption liquid before, after, or contemporaneously with the introduction of the gaseous stream. An oxidizer, typically comprising or containing oxygen or air, is added to the aqueous absorption liquid after the hydrogen sulfide has been absorbed and the aqueous liquid separated from the gaseous stream. Molecular oxygen, typically atmospheric air, can be added at any convenient place in the aqueous liquid treatment unit provided care is taken to prevent mixing oxygen with flammable gases, e.g., methane. A treatment unit may be operated at greater than atmospheric pressure to facilitate the dissolving or contacting of the oxygen in the aqueous absorption liquid. Advantageously, the method does not require any electrolytic processing.

Maintaining the aqueous absorption liquid at a pH that permits the absorption of hydrogen sulfide from the biogas provides the added benefit of converting the sulfides to non-hazardous, water-soluble products, including thiosulfate, while avoiding the precipitation of elemental sulfur. To maintain the pH in the preferred range, at least one base can be added, wherein said at least one base can comprise a species selected from the group consisting of sodium hydroxide, potassium hydroxide, ammonia, ammonium hydroxide, calcium hydroxide, magnesium hydroxide, and any combination thereof. Bases comprising carbonates, which can produce a gas when acidified, are not recommended because they may interfere with the absorption process. In some instances, the biogas contains an alkaline gas, such as ammonia, which will be absorbed in the aqueous absorption liquid and reduce the amount of base required. The pH can be monitored and adjusted continuously or periodically, as readily understood by the person skilled in the art. The aqueous absorption liquid in the treatment unit can optionally be agitated, for example by stirring, sonication, aeration, shaking, or any combination thereof. Filtration, ultrafiltration or other means of separation can optionally be used to separate the soluble products of the treatment from any insoluble sulfur dye that is retained by the separator. Sulfur dye compounds separated in this manner can be reused in future sulfide oxidation processes.

With the removal of the sulfides from the aqueous absorption liquid, the methane can be harvested for energy production with a significantly reduced hydrogen sulfide content.

The introduction of the biogas to an aqueous absorption liquid is understood by the person skilled in the art. For example, the biogas can be introduced directly into the aqueous absorption liquid using an absorber, packed bed scrubber, tray scrubber, venture scrubber gas bubbler, gas diffuser, spray column or any other device to allow contact between the biogas and the absorption liquid.

The molecular oxygen can be air, pure oxygen, or a gas comprising oxygen in some percentage between about 10% and about 100%, by volume. The oxygen can be diffused or bubbled into the aqueous absorption liquid and/or can come from the surface transfer of oxygen from the air (e.g., ambient or higher pressure air) above the aqueous absorption liquid in the treatment unit.

An oxidation/reduction potential (ORP) meter can be used to determine when the sulfides have been substantially treated. In most matrices, an ORP reading will become less negative as sulfide is oxidized. Depending on the matrix, a reading less negative than about −100 mV usually indicates that the sulfides have been substantially treated.

The method can be operated over a wide range of conditions, including temperature, hydrogen sulfide concentration, dye concentration, and oxygen input. The rate of hydrogen sulfide treatment is dependent, at least to some extent, on all four of these parameters. While a higher temperature will generally increase the reaction rate, a higher temperature will also tend to reduce the solubility of oxygen in water. Solubility of oxygen in water is increased by higher pressure. The optimum conditions for best economy depend greatly on the particular circumstances. Since the present invention has utility in a vast range of applications, the optimum conditions will vary widely also. The examples provided demonstrate the robust nature of this method over a wide range of conditions.

As previously introduced by the present inventor, the addition of sulfur dye and introduction of oxygen to virtually any sulfide bearing aqueous solution will reduce the sulfide concentrations. Sulfide treatment units can be set up to operate continuously or as batch processes. Typically, the absorption fluid will be recycled through the absorption unit numerous times.

As discussed hereinabove, the methane from the biogas can be harvested for energy production. Accordingly, the treatment unit is a system, e.g., a closed system, that permits the capture of the methane following introduction of the biogas to the aqueous absorption liquid, i.e., after the concentration of hydrogen sulfide has been reduced. It is further contemplated that the treatment unit can further comprise means to reduce the concentration of carbon dioxide in the biogas, as readily understood by the person skilled in the art.

The sulfur dyes and sulfurized vat dyes which may be used in accordance with the processes of the invention include those which are either 1) provided in the non-reduced (oxidized) form (where sulfur atoms attached to the dye chromophore are predominantly connected to other chromophore units through disulfide or polysulfide linkages), 2) provided as pre-reduced (Leuco) sulfur dyes (where sulfur atoms exist primarily as thiolate salts), or 3) provided as solubilized sulfur dyes where Bunte salt groups impart water solubility under non-reducing conditions.

Sulfurized vat dyes are chemically and structurally similar to sulfur dyes including having the disulfide/thiolate functionality. They are given the vat dye designation because they are typically dyed using a vat dye process.

Sulfur dyes and sulfurized vat dyes can be dissolved by reducing agents such as sodium sulfide, sodium dithionite or sodium hydrosulfide under alkaline conditions. This reduction breaks the disulfide bonds producing very polar thiolate groups (Dye-S⁻). This form of the dye is called a Leuco Sulfur Dye. The oxidation/reduction of the sulfur atoms attached to the chromophore structure is reversible as follows:

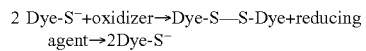

2 Dye-S⁻+oxidizer→Dye-S—S-Dye+reducing agent→2Dye-S⁻

Sulfur dyes can also exist as a non-reduced, water soluble form characterized by thiosulfate groups attached to the chromophores (Dye-S—SO₃⁻). This form is called a Bunte Salt and is categorized as a Solubilized Sulfur Dye. Solubilized Sulfur Dyes can be prepared by oxidative reaction of a sulfur dye with sulfite. Solubilized Sulfur Dyes will convert to one of the other dye forms when reacted with sulfides. Any of the three forms of sulfur dyes may be used in accordance with this method.

During sulfur dye production and dyeing processes, sulfides can undergo oxidation when Leuco dyes are converted to the insoluble non-reduced (oxidized) form with air. However, this oxidation of sulfides has not been attributed to the presence of the dye. There is no evidence that anyone has recognized that the addition of sulfur dyes or sulfurized vat dyes will act as a catalyst for the treatment of unwanted sulfides in waste waters and other aqueous fluids. It has been discovered that these dyes, even in very low molar concentrations, will treat sulfides in aqueous fluids.

Without being bound by theory, it is believed that the mechanism of the sulfide treatment of the present invention is that the sulfur dye in the non-reduced (oxidized) form reacts with sulfide in solution to oxidize the sulfide to a harmless compound, such as sodium thiosulfate. In reacting the sulfur dye in the sulfide treatment process, the sulfur dye is converted to the Leuco (reduced) form of the dye. When the thus produced Leuco form of the dye is contacted with oxygen or another suitable oxidizer, the Leuco dye is restored to the non-reduced state ready to react with more sulfide. If the absorption liquid is contacted with a Leuco form of the sulfur dye; it is required to simultaneously contact the absorption liquid with an oxidizer such as air to provide the sulfide treatment. While the exact structures and molecular weights of most sulfur dyes are not known, the molecular weight of an individual chromophore unit of Sulfur Black 1 is believed to be about 548 based on a common proposed structure. This molecular weight is about 14 times the weight of a sulfide ion. The method of this invention is demonstrated to be very effective at molar ratios of sulfur dye to sulfide that are less than 1 mole %. More preferably, the molar ratio of sulfur dye to sulfide is effective at less than about 0.6 mole %. This strongly supports that the dye used in this method acts as a catalyst to provide the sulfide treatment.

Sulfur dyes and sulfurized vat dyes which may be utilized in accordance with the method of the invention include but are not limited to the following ("C.I." stands for "Colour Index"):

C.I. Sulfur Yellow 1, 2, 3, 4, 5, 6, 8, 9, 10, 11, 12, 13, 14, 16, 20 and 23, C.I. Leuco Sulfur Yellow 2, 4, 7, 9, 12, 15, 17, 18, 21, 22 and 23 and C.I. Solubilized Sulfur Yellow 2, 4, 5, 19, 20 and 23;

C.I. Sulfur Orange 1, 2, 3, 4, 5, 6, 7 and 8, C.I. Leuco Sulfur Orange 1, 3, 5 and 9 and C.I. Solubilized Sulfur Orange 1, 3, 5, 6, 7 and 8;

C.I. Sulfur Red 1, 2, 3, 4, 5, 6, 7, 8, 9, 10, 12 and 13, C.I. Leuco Sulfur Red 1, 4, 5, 6, 11 and 14 and C.I. Solubilized Sulfur Red 3, 6, 7, 11 and 13;

C.I. Sulfur Violet 1, 2, 3, 4 and 5, C.I. Leuco Sulfur Violet 1 and 3 and C.I. Solubilized Sulfur Violet 1;

C.I. Sulfur Blue 1, 2, 3, 4, 5, 6, 7, 8, 9, 10, 11, 12, 13, 14, 15, 16, 17, 18 and 19, C.I. Leuco Sulfur Blue 1, 2, 3, 5, 7, 8, 9, 11, 13, 15 and 20 and C.I. Solubilized Sulfur Blue 1, 2, 4, 5, 6, 7, 10, 11, 13, and 15;

C.I. Sulfur Green 1, 2, 3, 4, 5, 6, 7, 8:1, 9, 10, 11, 12, 13, 14, 15, 16, 17, 18, 19, 20, 21, 22, 23, 24, 25, 26, 27, 28, 29, 31, 32 and 33, C.I. Leuco Sulfur Green 1, 2, 3, 4, 7, 11, 16, 30, 34, 35, 36, and 37 and C.I. Solubilized Sulfur Green 1, 2, 3, 6, 7, 9, 19, 26, and 27;

C.I. Sulfur Brown 1, 2, 3, 4, 5, 6, 7, 8, 9, 10, 11, 12, 13, 14, 14:1, 15, 15:1, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 53:1, 54, 55, 56, 57, 58, 59, 60, 61, 62, 63, 64, 65, 66, 67, 68, 69, 70, 71, 72, 73, 74, 76, 77, 78, 79, 84, 85, 87, 88, 89, 90, 91, 93, and 94; C.I. Leuco Sulfur Brown 1, 3, 4, 5, 8, 10, 11, 12, 14, 15, 21, 23, 26, 31, 37, 43, 44, 81, 82, 86, 87, 90, 91, 92, 93, 94, 95 and 96 and C.I. Solubilized Sulfur Brown 1, 4, 5, 8, 10, 11, 12, 14, 15, 16, 21, 26, 28, 31, 51, 52, 56, 60, 75, 80, and 83;

C.I. Sulfur Black 1, 2, 3, 4, 5, 6, 7, 8, 9, 10, 11, 12, 13, 14, 15, 16 and 17;

C.I. Leuco Sulfur Black 1, 2, 6, 9, 10, 11, and 18;

C.I. Solubilized Sulfur Black 1, 2, 5, 7, and 11; and,

C.I. Vat Yellow 21, C.I. Vat Orange 21, C.I. Vat Green 7, C.I. Vat Blue 7, 42, 43, Vat Black 11.

A more complete listing of the sulfur dyes and sulfurized vat dyes mentioned hereinabove may be found in the Colour Index, 3rd. Ed., issued by the Society of Dyers and Colourists (London, GB), as well as in the supplementary volumes published thereto and in the Colour Index International, 4$^{th}$ Edition Online which are hereby incorporated by reference.

At least one sulfur dye or sulfurized vat dye listed hereinabove is used to treat aqueous sulfides in the process of the instant invention. More preferably, at least one of C.I. Sulfur Black 1, C.I. Leuco Sulfur Black 1 and C.I. Solubilized Sulfur Black 1 is utilized in accordance with the process to treat sulfides based on economics and availability.

Compounds other than those listed by Colour Index International may exist or be synthesized which chemically qualify as sulfur dyes or sulfurized vat dyes and may be utilized in accordance with the method of this invention. Such compounds might not possess a sufficiently desirable color or fastness to be offered as a dye, yet perform acceptably in the method of this invention. The terms "sulfur dye" and "sulfurized vat dye" as used in this invention include compounds comprised of monocyclic aromatic, heteroaromatic, or quinoid chromophore units; or polycyclic aromatic, heteroaromatic, or quinoid chromophore wherein said chromophore units are connected by disulfide or polysulfide linkages when in the non-reduced form. Sulfur dyes and sulfurized vat dyes can be converted to the reduced (or Leuco) form by reaction with reducing agents such sodium sulfide, sodium dithionite or sodium hydrosulfide. This reaction cleaves the disulfide linkages of the non-reduced (oxidized) dye to form thiolate functional groups (dye-S$^-$). This conversion between disulfide and thiolate functionality is reversible.

A series of examples was developed and carried out to explore the concept of the method for treating aqueous solutions containing sulfides by contacting the aqueous solution containing the sulfide with a sulfur dye or sulfurized vat dye. It was discovered that the concentration of sulfide in the aqueous sulfide solutions could be reduced by more than 90 percent on the basis of the weight of the sulfide present in the aqueous sulfide solution. More preferably, the concentration of sulfide in the aqueous sulfide solutions could be reduced by more than 95 percent on the basis of the weight of the sulfide present in the aqueous sulfide solution. Most preferably, the concentration of sulfide in the aqueous sulfide solutions could be reduced by more than 96, 97, 98, 99, or 99.5 percent on the basis of the weight of the sulfide present in the aqueous sulfide solution. The process of the present invention was demonstrated over a reaction temperature range of from about 1° C. to about 100° C. More preferably, the process of the present invention can be carried out over a reaction temperature of from about 4° C. to about 80° C. Most preferably, the process of the present invention can be carried out over a reaction temperature of from about 20° C. to about 50° C. The sulfur dye was dissolved in aqueous sulfide solutions in sulfur dye concentrations ranging from about 10 to about 1200 mg/l. These dye concentrations are based on the concentration of commercial dye products which contain less than 100% active dye ingredient. Over the entire range of aqueous sulfide solutions having a concentration of sulfide from about 100 to about 5000 mg/l, it was found that the addition of sulfur dye or sulfurized vat dye resulted in a greater than 96 weight percent reduction of the sulfide in the aqueous sulfide solutions within a treatment time ranging from about 30 minutes to about 120 minutes. When using Sulfur Black 1 as the sulfur dye, the reduction of the sulfide concentration ranged from about 97 to about 99.6 weight percent based on the initial amount of sulfide in the aqueous sulfide solution to be treated, reducing the final concentration of sulfide from as high as about 5000 mg/l to as low as less than about 1 mg/l sulfide in the treated effluent. Table 1 shows a summary of the results of experiments related to the reduction of sulfides in aqueous solutions using sulfur dyes and sulfurized vat dyes compared to a reference case (Zero) wherein no sulfur dye or sulfurized vat dye was added to the aqueous sulfide solution.

TABLE 1

Comparison of Sulfide Treatment with Sulfur Dyes and Sulfurized Vat Dyes

| Ex. No. | Dye | Dye Conc. (mg/l) | Temp (° C.) | Sulfide Initial (mg/l) | Sulfide Final (mg/l) | Treatment Time (Min) | Reduction (%) |
|---|---|---|---|---|---|---|---|
| Zero | None | 0 | 43-46 | 500 | >490 | 120 | <2 |
| 1 | Sulfur Black 1 | 251 | 43-46 | 478 | <1 | 50 | 99.6 |
| 2 | Sulfur Black 1 | 250 | 4-6 | 250 | <5 | 120 | >98 |
| 3 | Sulfur Black 1 | 250 | 78-80 | 250 | <1 | 30 | >99.6 |
| 4 | Sulfur Black 1 | 10 | 42-45 | 100 | 3 | 30 | 97 |
| 5 | Sulfur Black 1 (reused) | 247.5 | 50 | 495 | 6 | 105 | 98.8 |
| 6 | Leuco Sulfur Brown 37 | 1200 | 45-48 | 500 | <20 | 60 | >96 |
| 7 | Leuco Vat Blue 43 | 1200 | 44-45 | 500 | <2.5 | 60 | >99.5 |
| 8 | Sulfur Black 1 | 500 | 40-45 | 5000 | 50 | 75 | 99 |

EXAMPLES

The following examples are intended to demonstrate the wide range of conditions under which sulfur dyes and sulfurized vat dyes are effective in treating sulfide when an oxidizer (in these examples air) is introduced into the aqueous fluid which contains the sulfide.

Example Zero

Control Without Dye

A 1000 mg/l stock sulfide solution (as $S^{-2}$) was made by dissolving 1.503 grams of sodium sulfide nonahydrate in distilled water and diluting it to 250 milliliters. A 100 milliliter sample of 500 mg/l sulfide test solution was made by diluting 50 milliliters of the stock solution to 100 milliliters with distilled water. An aliquot was taken from the sulfide test solution for analysis under buffered pH and ionic strength conditions using a sulfide specific ion electrode calibrated using freshly prepared sulfide standards. (This method of analysis was used for all sulfide analyses in the examples.) The test solution was stirred and heated to 45° C., at which time an air sparge through a diffuser was initiated. The stirred and aerated test solution was maintained at a temperature of 45+/−2° C. Samples were withdrawn for analysis every 30 minutes for 2 hours. A decrease in sulfide concentration of less than 2% relative to the initial sulfide concentration of 500 mg/l was observed after two hours, demonstrating that the sulfide concentration was not markedly affected by the test conditions.

Example 1

C.I Sulfur Black 1

While the initial test of Example Zero was underway, a 1% solution of C.I. Sulfur Black 1 product was prepared by diluting 1 gram of C.I. Sulfur Black 1 to 100 milliliters with distilled water while stirring and heating to 80° C. A 1.8 milliliter portion of the 1% solution was added to the remaining 70 milliliters of test solution from Example Zero to produce a calculated sulfide concentration of 478 mg/l and a Sulfur Black 1 product concentration of 251 mg/l. The test solution was maintained at the same test conditions of temperature, stirring and air sparging as the control in Example Zero. After 30 minutes of sparging, the sulfide concentration in the test sample of Example 1 had decreased to less than 10 mg/l. After 50 minutes the sulfide concentration in the test sample of Example 1 had dropped to less than 2 mg/l; a reduction of approximately 99.6% relative to the initial sulfide concentration of 478 mg/l.

Example 2

C.I. Sulfur Black 1

A test solution containing 250 mg/l sulfide and 250 mg/l of C.I. Sulfur Black 1 product was made by diluting 25 milliliters of the 1000 mg/l sulfide stock solution prepared in Example Zero with 72.5 milliliters of distilled water. The test solution of Example 2 was cooled to 5° C., and then 2.5 milliliters of the 1% Sulfur Black 1 solution prepared in Example 1 was added. The test solution of Example 2 was stirred and sparged with air as in Example 1, while maintaining the test solution of Example 2 at a temperature in the range of 4-6° C. with an ice bath. After 120 minutes a sample of the test solution of Example 2 was collected, and determined to have a sulfide concentration of less than 5 mg/l. This resulted in a reduction of sulfide content by about 98% relative to the initial sulfide concentration of 250 mg/l.

Example 3

C.I. Sulfur Black 1

This test used similar test conditions to Example 2. A test solution containing 250 mg/l sulfide and 250 mg/l of Sulfur Black 1 product was heated to 80° C. at which time air sparging was initiated. After 15 minutes of sparging the sulfide concentration had decreased to approximately 5 mg/l and after 30 minutes, the sulfide concentration had decreased to less than 1 mg/l, a reduction of over 99.6% relative to the initial sulfide concentration of 250 mg/l.

Example 4

This test was performed under similar conditions to Example 1 except that the initial sulfide concentration was 100 mg/l and the sulfur dye product concentration was 10 mg/l. After air sparging for 30 minutes at a temperature of 42-45° C., the sulfide concentration had decreased to less than 3 mg/l. This represents a reduction in the sulfide concentration of about of 97% relative to the initial sulfide concentration of 100 mg/l.

Example 5

C.I. Sulfur Black 1

This example demonstrates that the dye component can be reused. After treating a test solution of 500 mg/l sulfide and 250 mg/l Sulfur Black 1 by air sparging at 50° C. to a final sulfide concentration of less than 1 mg/l, the used mixture was replenished with sulfide and re-treated. A 1.75 milliliter portion of 5% sulfide was added to 175 milliliters of used sulfur dye test mixture producing calculated concentrations of 495 mg/l sulfide and 247.5 mg/l sulfur black product. This replenished mixture was stirred and sparged at 50° C. for 105 minutes resulting in a final sulfide concentration of approximately 6 mg/l, a 98.8% reduction in sulfide concentration relative to the initial sulfide concentration of 495 mg/l.

Example 6

C.I. Leuco Sulfur Brown 37

This test was similar to previous tests except a sulfur dye product containing C.I. Leuco Sulfur Brown 37 was used to treat the sulfide solution instead of C.I. Sulfur Black 1. A solution of C.I. Leuco Sulfur Brown 37 dye was made by diluting 6 grams of DIRESUL Brown RDT-GS liq 150, a liquid dyestuff solution of C.I. Leuco Sulfur Brown 37 dye (Available from Archroma U.S., Inc., Charlotte, N.C.) to 50 milliliters with distilled water. A 500 mg/l sulfide test solution was prepared by diluting 50 milliliters of 1000 mg/l stock sulfide solution to 99 milliliters. This solution was heated to 45° C. and 1 milliliter of the diluted Brown dye was added to produce a solution containing 1200 mg/l of formulated dye product. The solution was stirred and sparged as in previous examples. After 30 minutes the sulfide level had dropped by approximately 90%. After 60 minutes the sulfide concentration was less than 20 mg/l, a greater than 96% reduction in sulfide concentration relative to the initial sulfide concentration of 500 mg/l.

Example 7

C.I. Leuco Vat Blue 43

This test was similar to previous tests except a dye product containing C.I. Leuco Vat Blue 43 was used to treat the sulfide solution. A solution of C.I. Leuco Vat Blue 43 dye was made by diluting 12 grams of DIRESUL Navy RDT-GF 1 liq dyestuff product (Available from Archroma U.S., Inc., Charlotte, N.C.) to 100 milliliters with distilled water. A 500 mg/l sulfide test solution was prepared by diluting 50 milliliters of 1000 mg/l stock sulfide solution to 99 milliliters. This solution was heated to 45° C. and 1 milliliter of diluted Navy dye was added to produce a solution containing 1200 mg/l of formulated dye product. The solution was stirred and aerated as in previous examples. After 30 minutes the sulfide level had dropped by more than 98% to less than 10 mg/l. After 60 minutes the sulfide concentration was less than 2.5 mg/l, a greater than 99.5% reduction in sulfide concentration relative to the initial sulfide concentration of 500 mg/l.

Example 8

C.I. Sulfur Black 1

A test sulfide solution was made by dissolving 3.745 grams of sodium sulfide nonahydrate in distilled water and diluting to a total volume of 99 milliliters. This solution was heated to 45° C. One milliliter of 5% C.I. Sulfur Black 1 solution was then added to produce a test solution of 5000 mg/l sulfide and 500 mg/l Sulfur Black 1. The test solution was stirred and sparged with air while maintaining the test solution temperature in the 40-45° C. range. After 75 minutes a sample was collected and determined to have a sulfide concentration of slightly less than 50 mg/l, a reduction of approximately 99% relative to the initial sulfide concentration of 5000 mg/l.

What is claimed is:

1. A method of removing hydrogen sulfide from biogas and treating removed hydrogen sulfide, said method comprising:
    introducing the biogas to an aqueous absorption liquid to absorb at least a portion of the hydrogen sulfide in the liquid;
    harvesting any gas remaining, wherein the remaining gas has a concentration of hydrogen sulfide that is reduced relative to the biogas;
    introducing at least one sulfur dye catalyst or sulfurized vat dye catalyst to the aqueous absorption liquid;
    introducing a gas comprising oxygen to oxidize sulfides in the aqueous absorption liquid to soluble sulfur-containing salts; and
    separating the soluble sulfur-containing salts in the treated aqueous absorption liquid from the at least one sulfur dye catalyst or sulfurized vat dye catalyst; wherein the aqueous absorption liquid has a pH that permits the absorption of hydrogen sulfide from the biogas while preventing the precipitation of elemental sulfur during oxidation.

2. The method of claim 1, wherein the sulfides are selected from the group consisting of hydrogen sulfide, bisulfide ions, sulfide ions, polysulfide ions and mixtures thereof.

3. The method of claim 1, wherein said at least one sulfur dye catalyst or sulfurized vat dye catalyst is selected from the group consisting of Sulfur Black 1, Leuco Sulfur Black 1, Solubilized Sulfur Black 1, and mixtures thereof.

4. The method of claim 1, wherein said at least one sulfur dye catalyst or sulfurized vat dye catalyst is introduced into the aqueous absorption liquid as the Leuco (reduced) form of the dye catalyst.

5. The method of claim 1, wherein the sulfides comprise hydrogen sulfide.

6. The method of claim 1, wherein the pH is maintained by adding at least one base selected from the group consisting of sodium hydroxide, potassium hydroxide, ammonia, ammonium hydroxide, calcium hydroxide, magnesium hydroxide, and any combination thereof.

7. The method of claim 1, wherein the water-soluble salts comprise thiosulfate ions.

8. The method of claim 1, wherein the method operates continuously or as batch processes.

9. The method of claim 1, wherein elemental sulfur is not precipitated during oxidation of absorbed hydrogen sulfide.

10. The method of claim 1, wherein the remaining gas comprises methane or other hydrocarbon fuel.

11. The method of claim 1, wherein the harvesting of any remaining gas occurs before the gas comprising oxygen is introduced to the aqueous absorption liquid.

12. The method of claim 1, wherein the method does not require any electrolytic processing.

13. The method of claim 1, wherein the at least one sulfur dye catalyst or sulfurized vat dye catalyst separated from the treated aqueous absorption liquid is reused.

14. The method of claim 1, wherein the separation can be effectuated using filtration or ultrafiltration.

15. The method of claim 1, wherein the pH is in a range from about 6.8 to about 11.

* * * * *